United States Patent
Aloisio et al.

(10) Patent No.: US 11,509,694 B1
(45) Date of Patent: Nov. 22, 2022

(54) METHODS AND SYSTEMS FOR NETWORK DEVICE RECONFIGURATIONS

(71) Applicant: ARCHITECTURE TECHNOLOGY CORPORATION, Eden Prairie, MN (US)

(72) Inventors: Scott Aloisio, Ithaca, NY (US); Robert Joyce, Ithaca, NY (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 154 days.

(21) Appl. No.: 17/129,439

(22) Filed: Dec. 21, 2020

Related U.S. Application Data

(63) Continuation of application No. 16/012,670, filed on Jun. 19, 2018, now Pat. No. 10,873,604.

(51) Int. Cl.
*H04L 29/06* (2006.01)
*H04L 9/40* (2022.01)
(Continued)

(52) U.S. Cl.
CPC .......... *H04L 63/20* (2013.01); *H04L 41/0816* (2013.01); *H04L 63/0209* (2013.01);
(Continued)

(58) Field of Classification Search
CPC . H04L 63/20; H04L 41/0816; H04L 63/0209; H04L 63/0281; H04L 63/1441; H04L 61/5007
See application file for complete search history.

(56) References Cited

U.S. PATENT DOCUMENTS 6,353,854 B1 3/2002 Cromer et al.
6,721,872 B1 4/2004 Dunlop et al.
(Continued)

FOREIGN PATENT DOCUMENTS

CN 107678776 A 2/2018

OTHER PUBLICATIONS

Aime et al., "Automatic (re) Configuration of IT Systems for Dependability." IEEE Transactions on Services Computing 4.2, pp. 110-124, (Year: 2010).
(Continued)

*Primary Examiner* — Shawnchoy Rahman
(74) *Attorney, Agent, or Firm* — Foley & Lardner LLP

(57) ABSTRACT

Disclosed herein are embodiments of systems and methods that dynamically reconfigure a multi-tiered system of network devices and software applications in response to an ongoing and/or anticipated cyber-attack. The dynamic reconfiguration of the network devices may consist of a wide range of processes, which may include generating new network addresses for individual network devices; reconfiguring the network devices by creating firewalls, changing protocols between the network devices in a multi-tier reconfiguration solution, changing the cloud infrastructure provider of the network devices, even when the underlying network infrastructure ecosystem differs across cloud service providers (CSPs); and maintaining a secure and updated data model of a record of reconfigured network devices and their dependencies to allow legitimate users of the network devices to understand reconfiguration actions that are hidden from malicious users such as hackers and cyber-attackers.

20 Claims, 3 Drawing Sheets

(51) Int. Cl.
*H04L 41/0816* (2022.01)
*H04L 61/5007* (2022.01)

(52) U.S. Cl.
CPC ...... *H04L 63/0281* (2013.01); *H04L 63/1441* (2013.01); *H04L 61/5007* (2022.05)

(56) References Cited

U.S. PATENT DOCUMENTS

| | | | |
|---|---|---|---|
| 8,060,592 B1 * | 11/2011 | Watsen | H04L 41/082 709/225 |
| 9,614,720 B2 * | 4/2017 | Enyedi | H04L 45/16 |
| 9,705,978 B1 | 7/2017 | Kenigsberg et al. | |
| 10,735,300 B1 | 8/2020 | Willson et al. | |
| 2003/0088651 A1 * | 5/2003 | Wilson, Jr. | G06F 8/65 709/221 |
| 2004/0225952 A1 | 11/2004 | Brown et al. | |
| 2005/0063400 A1 | 3/2005 | Lum | |
| 2014/0258478 A1 | 9/2014 | Moghe et al. | |
| 2017/0012940 A1 | 1/2017 | Chang et al. | |
| 2017/0026335 A1 | 1/2017 | Dhulipala et al. | |

OTHER PUBLICATIONS

ATC-NY. OSD172-D13, F172-D13-0025, Phase I SBIR Proposal, "Parambulator", Jul. 20, 2017, 16 pages.

* cited by examiner

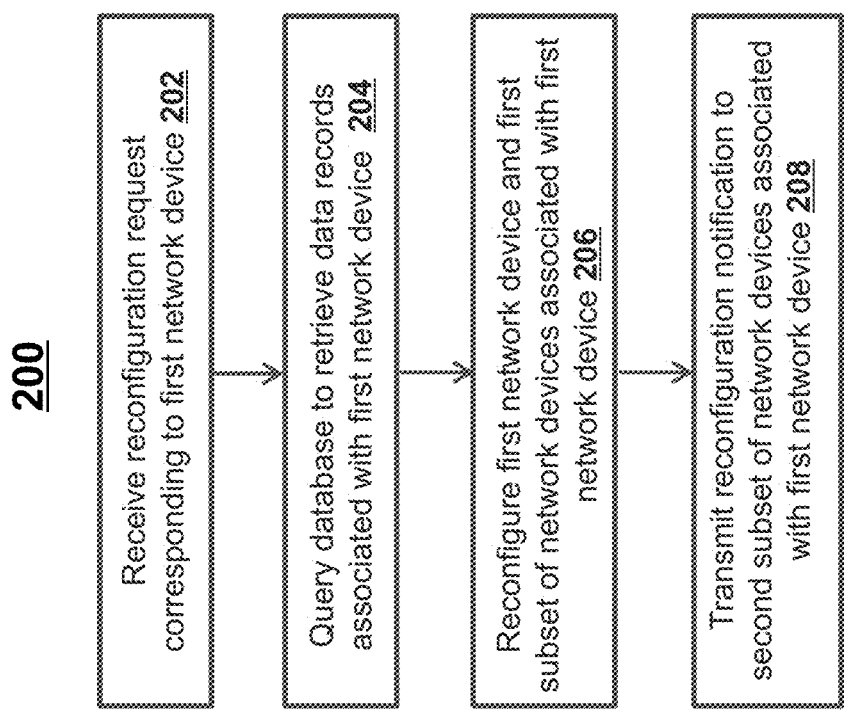

METHODS AND SYSTEMS FOR NETWORK DEVICE RECONFIGURATIONS

CROSS-REFERENCE TO RELATED APPLICATIONS

This application is a continuation application of U.S. application Ser. No. 16/012,670, filed Jun. 19, 2018, which is incorporated by reference in its entirety.

TECHNICAL FIELD

This application relates generally to field of network devices, and more specifically to methods and systems for reconfiguring the network devices.

BACKGROUND

Multi-tier network architectures contain complex dependency trees of multiple network devices. The network devices may include workstations, servers, databases, and computing nodes. In many instances, all or some of the network devices may be directly or indirectly connected to each other to operate together on a common task.

Hackers and well-equipped adversaries continually probe and cyber-attack the network architectures to exploit their computing resources and obtain sensitive data from such computing resources. The severity of the cyber-attacks varies between relatively innocuous reconnaissance activities to complete extraction of the sensitive data. In order to prevent adverse effects to computational integrity of the network devices, the entire cyber-attack spectrum needs to be addressed.

One way to address the cyber-attack spectrum is through a Moving Target Defense (MTD) method. The MTD method involves changing a landscape of network devices in anticipation of, or as a response to, an incoming cyber-attack. Changing the landscape of network devices involve re-assigning network device addresses, firewall reconfiguration, or even migrating applications on the network devices to new computing resources, among other techniques. For example, hackers and cyber-attackers typically attempt to understand the landscape of the network devices so that they can craft an exploitation technique, which can operate within the given landscape, but changing the landscape may provide a means to quickly delay and disrupt activities for the hackers and the cyber-attackers. Still, there are many challenges to overcome when considering the MTD method for cyber-attack mitigation. The most prevalent concern is that reconfiguration of the network devices will cause lost dependencies of associated devices, leading to a failure of legitimate applications associated with the network devices. Even when the network devices are thoroughly reconfigured, the cyber-attack landscape still does not change drastically enough to deter the hackers and the cyber-attackers. Additionally, it is essential that reconfiguration of the network devices complete quickly in cases where there is an immediate and ongoing cyber-attack threat. A solution is thus desired that maintains network devices dependencies, provides a potential for strong reconfiguration techniques of the network devices, and performs reconfiguration of the network devices quickly without putting undue burden on applications within a pool of these network devices.

Another major limitation of the MTD methods is that software applications that depend on the network devices must quickly adapt to the changing landscape without disclosing their adaptation procedure to various malicious applications. If unauthorized and/or malicious applications can adapt to the changing landscape similar to legitimate software applications, then there is no benefit gained through the MTD method. In some cases, many MTD method limitations may be overcome by accepting special restrictions on reconfiguration techniques, system architecture, or target software application. However, restricting the scope of the reconfigurable operations inhibits many practical operations, makes reconfiguration of the network devices more predictable, and frequently requires unfamiliar whole network computing system configuration.

SUMMARY

What is therefore desired are systems and methods that provide a reconfiguration technique that can rapidly and automatically reconfigure multiple network devices (e.g., multi-tier servers) in response to an ongoing cyber-attack. During reconfiguration operations, a secure and updated data model of a record of reconfigured network devices and their dependencies is maintained that allows legitimate users of the network devices and software applications of the network devices to understand reconfiguration actions that are hidden from malicious users such as hackers and cyber-attackers.

Embodiments disclosed herein may solve the aforementioned technical problem and solve other technical problems as well. Embodiments disclosed herein describe network devices, such as servers, that are under continual cyber-attack by well-resourced adversaries, such as hackers and cyber-attackers. The methods and systems described herein attempt to provide an ability to dynamically reconfigure a protected, complex, multi-tiered system of network devices and software applications in response to an ongoing and/or anticipated cyber-attack. The dynamic reconfiguration of the network devices may consist of a wide range of processes, which may include generating new network addresses for individual network devices; reconfiguring the network devices by creating firewalls, changing protocols between the network devices in a multi-tier reconfiguration solution, changing the cloud infrastructure provider of the network devices, even when the underlying network infrastructure ecosystem differs across cloud service providers (CSPs); and maintaining a secure and updated data model of a record of reconfigured network devices and their dependencies to allow legitimate users of the network devices to understand reconfiguration actions that are hidden from malicious users such as hackers and cyber-attackers.

In some embodiments, a system may include a non-transitory storage medium configured to store a plurality of data records containing a network dependency configuration of a plurality of network devices; a processor coupled to the non-transitory storage medium and configured to: receive a network reconfiguration request of a first network device of the plurality of network devices; query the plurality of data records using an application programming interface of the network dependency configuration, to retrieve one or more data records containing a network dependency configuration of the first network device, the network dependency configuration of the first network device indicating a first set of network devices associated with the first network device; reconfigure the first network device based on the network reconfiguration request and propagate complementary reconfiguration notifications to a first subset of network devices of the first set of network devices based on the network dependency configuration of the first network device; and transmit a reconfiguration notification to a second subset of network devices of the first set of network devices in response to reconfiguring the first network device and propagating the complementary reconfiguration notifications to the first subset of the network devices.

In some embodiments, a computer-implemented may include receiving, by a computer, a network reconfiguration request of a first device of the plurality of network devices. The method may further include querying, by the computer, a non-transitory storage medium configured to store a plurality of data records containing a network dependency configuration of a plurality of network devices using an application programming interface of the network dependency configuration, to retrieve one or more data records containing a network dependency configuration of the first device, the network dependency configuration of the first device indicating a first set of devices associated with the first device. The method may further include reconfiguring, by the computer, the first device based on the network reconfiguration request and propagate complementary reconfiguration notifications to a first subset of devices of the first set of devices based on the network dependency configuration of the first device. The method may further include transmitting, by the computer, a reconfiguration notification to a second subset of devices of the first set of devices in response to reconfiguring the first device and propagating the complementary reconfiguration notifications to the first subset of the devices.

BRIEF DESCRIPTION OF THE DRAWINGS

The accompanying drawings constitute a part of this specification and illustrate embodiments of the subject matter disclosed herein.

FIG. 2 illustrates a method for reconfiguring network devices, according to an embodiment.

DETAILED DESCRIPTION

Figure 1A:
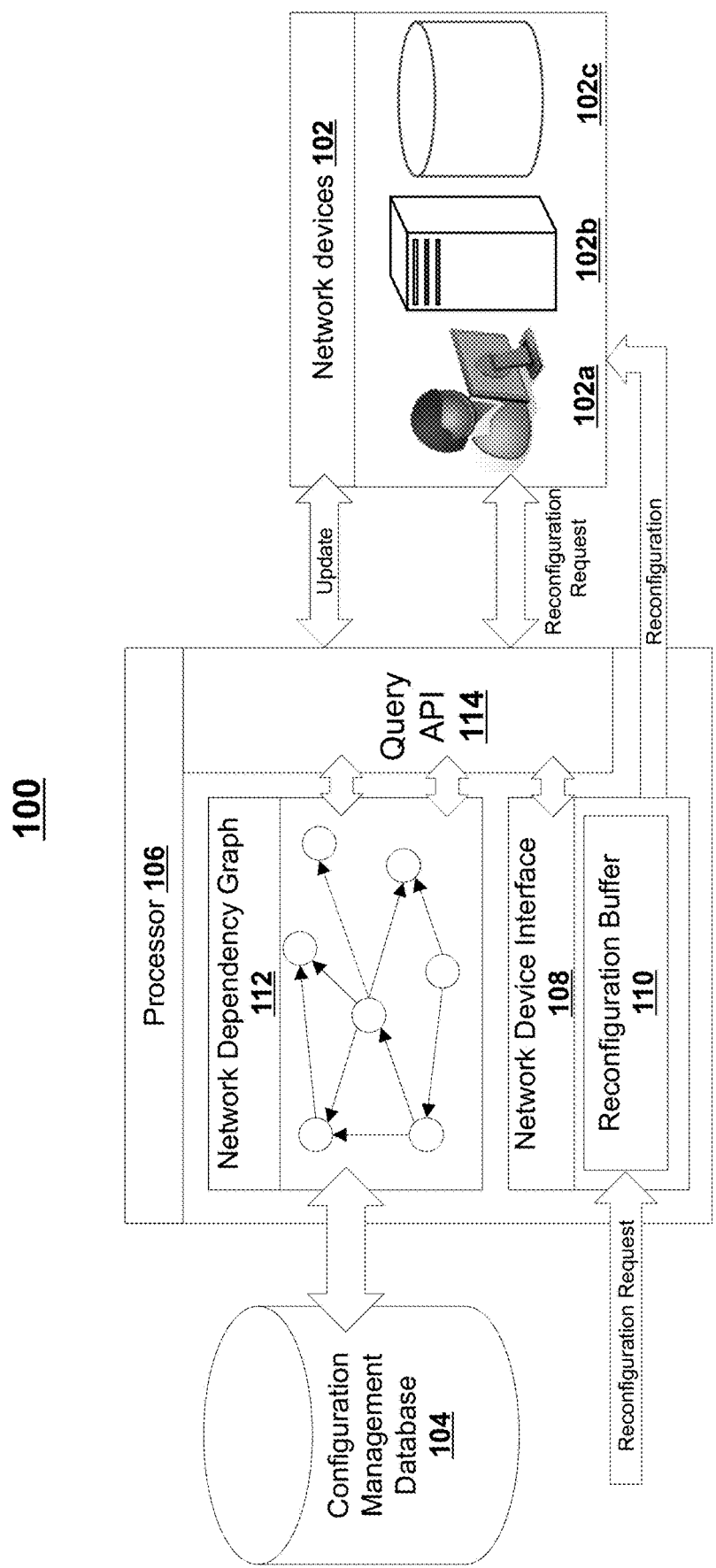
FIG. 1A illustrates a system for reconfiguring network devices, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Network devices may require cyber-attack prevention processes to sidestep a nearly continuous stream of incoming cyber-attacks. For this purpose, a software system is designed for reconfiguring the network devices susceptible to the incoming cyber-attacks based on a data model storing information of a physical and/or a virtual landscape of the network devices. The software system may issue reconfiguration commands/instructions to individual network devices, provide configuration metadata for authorized software applications of the network devices, and prevent dependency conflicts (i.e., conflicts corresponding to one or more devices directly or indirectly associated with the individual network devices that are being reconfigured) on abrupt reconfigurations of the individual network devices. The software system may help complex computing network environments sidestep cyber-attack reconnaissance by enabling context aware reconfiguration procedures that change the cyber-attack landscape of the network devices. The software system may further enable network device administrators and IT professionals to configure automated procedures for safely reconfiguring the network devices. The software system may further protect the network devices from persistent cyber-attacks, and thereby preventing a loss of time and financial resources. The underlying data model that the software system uses to inform the safety of reconfiguration operations enables network system maintenance procedures. Thus, the software system approach to automated dynamic reconfiguration of the network devices prevents cyber-attack reconnaissance, and provides fast remediation with low overhead costs.

The software system may comprise a network reconfiguration application that provides extensive reconfiguration of a network device run time configuration in order to protect the network device from any further progression in a cyber-attack. The network device attack surface, location, and communication methods are reconfigured with only minimal impact to the operation of the network devices. The network device may then continue to run in a new configuration, which may reside in a different cloud, with new network addresses, with changed security component components, and may further communicate internally with other devices with different protocols. One important aspect of reconfiguring an N-tier instantiation is being able to define a logical pattern of the network devices in terms of various other components associated with the network device, such as contemporary servers, communications paths, ports, protocols, and security components. The reconfiguration application may initially determine pattern of the network devices, and then logically equivalent substitutions may be made for the purpose of changing the attack surface. For example, if a first server communicates with a second server, using a first protocol, then the same effective communication can occur through a different communication path, between different addresses, possibly in different cloud.

A network system comprising a reconfiguration software module for reconfiguring one or more network devices susceptible to cyber-attacks is provided. The network system further comprises an up-to-date graph-structured software data model storing information of a physical and/or a virtual landscape of all the network devices. A communication module is configured to communicate information from the data model to the reconfiguration software module for reconfiguring the network devices. The data model displays complex network configurations of each of the network devices, asset dependencies of each of the network devices, and evolution of the data model over a predetermined period of time. The data model is based on a configuration management database (CMDB), which is a storage model for collecting landscape information associated with the network devices. The network device landscape may change naturally as the network system evolves, and accordingly processes are executed to maintain and update information about new network devices that are added, removed, and modified within the network system. In some cases, to assist with the maintenance process, the network system enables one or more modules to probe landscape of the network devices for changes in order to update the data model. The CMDBs may be utilized for inventory management and network device information analysis, and further provides the expressiveness necessary for modeling the complex relationships between network devices in multi-layered application infrastructures. Thus, the presentation and expressiveness of the information inherent in the software data model enables reconfiguration of the network devices with strong safeguards against dependent device destruction, and in due course enabling safe, fast, repeatable, and automated network device reconfiguration.

FIG. 1A illustrates a system 100 for reconfiguring network devices 102. The system 100 comprises various devices and software modules configured to evaluate configuration and operational status of various network devices 102, and then executing automated reconfiguration operations of the various network devices 102 to reconfigure the various network devices 102. The devices and the software modules of the system 100 may maintain and broadcast a secure and updated data model (which is updated over a period of time) of the network devices 102 consisting of network configurations of the network devices 102 and dependencies of the network devices 102 (for example, a list of each device dependent on each network device 102). The devices and the software modules of the system 100 may then use information associated with the data model to execute secure reconfiguration operations of the various network devices 102, improve cyber-attack monitoring capabilities within the system 100, transmit dependency information to users of the various network devices 102, transmit dependency information to software applications of the various network devices 102, and transmit a notification to dependent devices of the network devices 102, which have been reconfigured.

A system 100 may further include configuration management database 104 and a processor 106. In operation, initially a processor 106 may generate a network reconfiguration request to reconfigure a first network device (for example, a desktop computer 102a) from various network devices 102. In some embodiments, a processor 106 may automatically generate the network reconfiguration request to reconfigure the first network device. In one example, the processor 106 may automatically generate a network reconfiguration request to reconfigure the first network device after a predetermined period of time. In another example, a processor 106 may automatically generate a network reconfiguration request to reconfigure the first network device after an occurrence of a known or unknown event corresponding to the first network device. In some embodiments, a user may control generation of a network reconfiguration request to reconfigure a first network device. In one example, a user may execute instructions and/or software modules to generate the network reconfiguration request after a predetermined period of time. In another example, a user may execute instructions and/or software modules to generate the network reconfiguration request after an occurrence of a known or an unknown event corresponding to reconfigure the first network device.

Upon generation of the network reconfiguration request to reconfigure the first network device, a processor 106 may then transmit the network reconfiguration request to a network device interface 108. Upon transmission of the network reconfiguration request to the network device interface, a processor 106 may then place the network reconfiguration request into a queue within a reconfiguration buffer 110. While the network reconfiguration request is pending within the queue, a processor 106 may then query a network dependency graph 112 (depicting a graphical representation of network dependency configuration) using a query application programming interface (API) 114 to determine a first set of network devices (for example, a server computer 102b and other servers) dependent on or associated with the first network device. For instance, within the network dependency graph 112, each network device 102 may include a collection of data points which may apprise safe reconfiguration process of the network device 102. The data points may include the network dependency configuration depicting a record of each network device 102 dependent on each network device 102, a record of one or more probable reconfiguration operations for reconfiguring the network devices 102, and a record of one or more attributes corresponding to the network devices 102 on which the network devices 102 operate on.

Once the network reconfiguration request is verified and approved while being in the queue, a processor 106 may then execute a reconfiguration technique. Upon execution of the reconfiguration technique, a processor 106 may then transmit and execute one or more pre-configured reconfiguration commands to the first network device to reconfigure the first network device. At the same time, a processor 106 may also transmit and execute one or more complimentary reconfiguration commands to a first set of network devices dependent on or associated with the first network device to reconfigure the first set of network devices. In some embodiments, a processor 106 may transmit and execute one or more destructive reconfiguration commands to a first set of network devices dependent on or associated with the first network device to reconfigure the first set of network devices in order to obtain fast response time of the reconfiguration of the first set of network devices. In some embodiments, a processor 106 may evaluate additional status data associated with a first set of network devices, and then transmit and execute one or more destructive reconfiguration commands to the first set of network devices to reconfigure the first set of network devices when the first set of network devices are not in operation.

Network devices 102 may collaborate with each other to form an arrangement for sharing files and resources or for otherwise enabling communication between two or more network devices 102. The network devices 102 may include computing devices comprising a network device processor and/or a non-transitory machine-readable storage medium for performing various tasks and processes. In one example, the network device 102 may be a computer linked to a network via a network interface card (NIC), or to other devices that perform specialized functions in the network, such as repeaters or hubs, bridges, switches, and routers, to name a few examples. In another example, the network device 102 may be a multiple port bridge or switch, which includes processing logic or a network device processor, a port circuitry, and a memory, which includes any combination of non-volatile and programmable memory, such as read only memory (ROM), random access memory (RAM), etc. The network device processor, the port circuitry, and the memory may be implemented and coupled in any desired manner. For instance, the memory may be a central memory and coupled to both the network device processor and the port circuitry, or the memory is distributed within the network device 102, such as separate memory modules for the network device processor and the port circuitry. In some embodiments, the network device processor may perform the processing functions and procedures including initialization and configuration/re-configuration of the network device 102. The network device processor executes routines stored the memory for performing its various functions. For example, the network device processor performs the spanning tree functions. The network device processor may also perform ongoing management functions during operation, including dynamically reconfiguration of virtual LAN (VLAN).

Non-limiting examples of the network devices 102 may include a desktop computer 102*a*, a server computer 102*b*, a database 102*c*, and the like. For ease of explanation, FIG. 1A shows a single desktop computer 102*a*, a single server computer 102*b*, and a single database 102*c*. However, it should be appreciated that some embodiments may comprise any number of desktop computers, server computers, databases, and other network devices 102 capable of performing the various tasks. The desktop computer 102*a*, the server computer 102*b*, and the database 102*c* may be connected to each other through one or more networks. The networks may be categorized based on various features and functions, such as message capacity, range over which the network devices 102 such as a desktop computer 102*a*, a server computer 102*b*, a database 102*c* are distributed, network devices 102 types such as a desktop computer 102*a*, a server computer 102*b*, a database 102*c*, network devices 102 such as a desktop computer 102*a*, a server computer 102*b*, a database 102*c* relationships, topology or logical and/or physical layout, architecture or structure based on cable type and data packet format, access possibilities, etc. The range of the network may correspond to a distance over which the network devices 102 such as a desktop computer 102*a*, a server computer 102*b*, a database 102*c* are distributed, such as local-area networks (LANS) within an office or floor of a building, wide-area networks (WANs) spanning across a college campus, or a city or a state and global-area networks (GANs) spanning across national boundaries. The examples of the networks may include, but are not limited to, private or public LAN, WLAN, MAN, WAN, and the Internet. A network may include both wired and wireless communications according to one or more standards and/or via one or more transport mediums. The communication over the network may be performed in accordance with various communication protocols such as Transmission Control Protocol and Internet Protocol (TCP/IP), User Datagram Protocol (UDP), and IEEE communication protocols. In one example, the network may include wireless communications according to Bluetooth specification sets, or another standard or proprietary wireless communication protocol. In another example, the network may also include communications over a cellular network, including, e.g. a GSM (Global System for Mobile Communications), CDMA (Code Division Multiple Access), EDGE (Enhanced Data for Global Evolution) network.

Figure 1B:
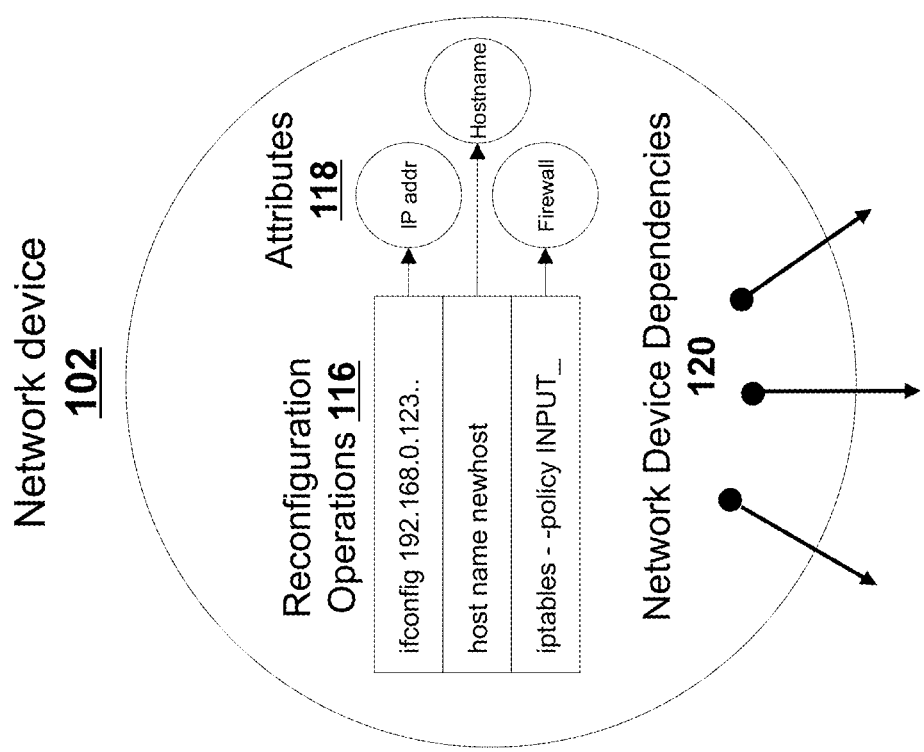
FIG. 1B illustrates a data model of network devices, according to an embodiment.

A user may operate a network device 102. Each network device 102 may utilize one or more data points to function and/or operate appropriately, as depicted in the FIG. 1B. A first data point 116 may be a list of reconfiguration operations for each network device 102, which may be structured as executable commands or application programming interface (API) instructions with a reference of a physical network device 102 target that has to be modified and reconfigured. A second data point 118 may correspond to a list of attributes (such as an IP address, a hostname, and a firewall) associated with each network device 102 that has to be modified and reconfigured. The list of attributes may correlate with a list of reconfiguration operations. A third data point 120 may be a list of dependencies for each network device 102 (i.e., each device associated with each network device 102). The information within the list of dependencies for a particular network device 102 may be used during reconfiguration operation of a particular network device 102 to determine when a reconfiguration operation changes a particular attribute that a particular network device 102 depends on.

One or more data points for each network device 102 may be stored in a software-based data model in form of a network dependency graph 112. The network dependency graph 112 is a graphical representation of various data points of the various network devices 102. During reconfiguration process of a network devices 102, a processor 106 (an external processor) and/or a network device processor of the network devices 102 being reconfigured may analyze and process data points for the network devices 102 being reconfigured stored in the network dependency graph 112 in order to pre-screen configuration process for the network devices 102 being reconfigured to verify and respond immediately to locked or occupied network devices 102 as well ensuring reconfiguration of all devices dependent upon or associated with the network device 102 being reconfigured.

For instance, a network device processor of the network devices 102 being reconfigured while executing reconfiguration operations, which may be user-defined, the network device processor may determine how the system 100 depends on the attributes of the network devices 102 that are being reconfigured and modified since without these considerations, it is likely that the attributes of the network devices 102 that are being reconfigured and modified will disrupt services of other associated devices that depend on the attributes of the network devices 102 that are being reconfigured and modified staying consistent. In such cases, application services on associated devices that depend on the attribute of the network devices 102 that have been reconfigured and modified, the application services may then have to be restarted or reconfigured. Accordingly, during the reconfiguration process of the network devices 102, a network device processor of the network devices 102 being reconfigured paves the way for a generalized reconfiguration framework that does not require a special dynamic system architecture as the network dependency graph 112 provides a restriction-free environment that safely augments the system 100 architecture with positive security practices, instead of possibly unsafe modifications.

Processor 106 may be any device of system 100 that supports network security and network reconfiguration efforts. The processor 106 may be configured, for example, to implement a symmetric multiprocessing environment, among other possible multi-processor environments. Non-limiting examples of the processor 106 may include a proxy server, a firewall, an intrusion detection device, and the like. The processor 106 may reconfigure a network device 102 in response to performing a network security function, such as updating a particular source IP address of a particular network device 102 or a particular network device, based on configurations of a particular network device 102. A configuration of a particular network device 102 may be a particular setting of network device 102 parameters that govern the operational characteristics of the network device 102.

In some embodiments, processor 106 may act a proxy server that may be a computing device, such as a server, configured to reconfigure network devices 102 and manage network communications between the enterprise network devices 102, such as a desktop computer 102*a*, a server computer 102*b*, a database 102*c* accessible via a network, such as websites or web-based applications hosted on external servers. The proxy server may provide a proxy gateway in effect when the communications inside or outside of the system 100 are prohibited. The proxy server may receive web-service queries from plural network devices 102 and operates to transfer the received web-service queries to external servers for providing a target service the network devices 102 would like to reach.

In some implementations, the proxy server may receive a web-service query from the network devices 102. The proxy server uses the IP address that corresponds to the physical address of the network devices 102 for the communications with the network devices 102. The proxy server may have a function of relaying a user's access to a resource device or the data of a website, for example. The network devices 102 communicate with the proxy server without direct communications with the external servers. The proxy server may review and filter data traffic with web-based resources, provide anonymity to the network devices 102, and log data traffic (e.g., inbound and outbound web-service requests). During operation, the proxy server may capture header information regarding the source network device 102 to determine whether to permit or block incoming data traffic based on which the processor 106, such as the proxy server, may then reconfigure the source network device 102.

A processor 106 may be configured to implement and execute reconfiguration process for reconfiguring the network devices 102. In some cases, the reconfiguration process for reconfiguring the network devices 102 may be user-defined. During execution of the reconfiguration process for reconfiguring the network devices 102, the processor 106 may identify one or more data points associated the network devices 102 being reconfigured to determine how other devices of the system 100 depends on one or more attributes (such as IP address, hostname) of the network devices 102 that are being modified. The processor 106 may identify one or more data points associated with the network devices 102 being reconfigured from a network dependency graph 112. The network dependency graph 112 may also contain information, including a hostname and authentication credentials, about connecting to other devices associated with or dependent upon the network devices 102 being reconfigured, and running a reconfiguration command on such associated devices. Then, application services on associated devices or the associated devices itself that depend on attributes of the network devices 102 that have been reconfigured and modified for operation are restarted and/or reconfigured.

In some embodiments, a processor 106 may execute one or more commands to ensure that all devices associated with a target network device 102 being reconfigured adapts to reconfiguration of the target network device 102 and/or changes in attributed associated with the target network device 102. For example, reconfiguring a device such as a Secure Shell (SSH) involves modifying a configuration file on a target network device 102 and then restarting the SSH service daemon. Thus, the processor 106 may execute scripts, or collections of commands, to address complex relationships between the network devices 102 and their attributes, and thereby enabling arbitrarily complex attribute relationships between the network devices 102 to be addressed and accounted for during reconfiguration process of the network devices 102.

In some embodiments, during execution of reconfiguration process for reconfiguring a target network device 102, a processor 106 may determine that external dependencies (external devices associated with or dependent upon the target network device 102 being reconfigured) require attribute consistency, and thus the processor 106 may provide more consideration before modifying such attributes of the target network device 102. The processor 106 may analyze a network dependency graph 112 where all network devices 102 are defined with external dependencies to identify external dependencies of the target network device 102. If, for example, a single device in a cluster of network devices 102 references an address of its "master" device, then changing the master device address by the processor 106 may cause the device to fail. To resolve such a problem, attributes of each network device 102 store references to their dependents devices, and when a reconfiguration operation is scheduled, a processor 106 may first begin by checking the network dependency graph 112 to determine if the target network device 102 has any dependent devices. Upon identification of the dependent devices, the processor 106 may then initiate reconfiguration of the target network device 102 and its dependent devices.

A processor 106 may reconfigure a target network device 102 and its dependent devices in multiple ways. In some embodiments, the processor 106 may execute a soft reconfiguration process to reconfigure a target network device 102 and its dependent devices. The soft configuration process maintains computational integrity of the system 100. In some embodiments, the processor 106 may execute a hard reconfiguration process to reconfigure a target network device 102 and its dependent devices. The hard reconfiguration may not maintain computational integrity, but protect the target network device 102 against complex cyber-attacks.

A soft configuration process may reconfigure or make changes to a software model associated with a target network device 102 and its dependent devices. For example, a processor 106 upon receiving the network reconfiguration request corresponding to a target network device 102, the processor 106 may then execute soft reconfiguration process that first accounts for all occupied dependent devices of the target network device 102 in a dependency graph 112 graph. For this purpose, the processor 106 may periodically update an additional data point in the target network device 102 that represents a status of the target network device 102 and its dependent devices. A pool of dependent devices is then identified, and, depending on the status of the target network device 102, the dependent devices are initially moved into an idle state and then reconfigured. Once all of the dependent devices have been reconfigured, then a processor 106 modified the original target network device 102.

A hard configuration process may reconfigure or make changes to a hardware of the target network device 102 and its dependent devices. During execution of the hard configuration process, a processor 106 may first move all dependent devices into an idle state, correct their dependency on the original target network device 102, and then destructively make changes to attributes of all the dependent devices and the target network device 102. The processor 106 is able to automatically perform soft and/or hard reconfiguration processes without any human interaction depending on a type of cyber-attack or a level of a threat. For instance, the processor 106 is able to override soft reconfiguration techniques and directly execute a hard reconfiguration, in response to identification of a more serious threat or a specific cyber-attack trigger.

Configuration management database 104 may be hosted on any server computer and are capable of storing records of network devices 102 in plain format and/or encrypted version containing data fields. The configuration management database 104 may be in communication with a processor of the network devices 102, where the processor is capable of executing the various commands of the system 100. In some embodiments, the configuration management database 104 may be part of the network devices 102. In some embodiments, the configuration management database 104 may be a separate component in communication with the network devices 102.

The configuration management database 104 may be configured to store data associated with an inventory of network devices 102, knowing a configuration of each network device 102, resetting or updating configurations as the need arises, and scheduling configuration changes. A configuration of each network device 102 is defined as a particular setting of the network device 102 parameters that govern the operational characteristics of the network device 102. The network devices 102 that are routinely configured may be computers, databases, routers, and hubs, and examples of device parameters include device thresholds, on/off switches, access security, etc.

Non-limiting examples of what may be stored in the configuration management database 104 may include user records that may comprise data fields describing, e.g., user data, such as user credentials (e.g., username, passwords, biometrics, encryption certificates) operating network devices 102, user roles, or user permissions; IP addresses of network devices 102; hostname of network devices 102; document records that may comprise machine-readable computer files (e.g., word processing files), parsed portions of such computer files, or metadata associated with computer files; and reconfiguration application data that may include software instructions executed by a processor 106 or data used by the such reconfiguration applications executed by the processor 106. The configuration management database 104 is further configured to store a plurality of security records such as a whitelist record and a blacklist record. The plurality of security records may include characteristic information about suspect network device IP address and/or network device IDs that pass and fail a cyber-attack credibility threshold. In some embodiments, upon determining that the network device IP address and/or device IDs fails an acceptability threshold, a processor 106 may update the whitelist record and/or the blacklist record in the configuration management database 104 with the details of the network device IP address and/or network device IDs that failed the cyber-attack acceptability threshold.

A configuration management database 104 may be associated with or interface with a network dependency graph 112. The network dependency graph 112 may depict a graphical representation of network dependency configuration of the various network devices 102. The network dependency configuration may correspond to defining and documenting each of the network device 102. The network devices 102 may include information technology (IT) devices, such as servers, databases, and other devices. In some embodiments, data corresponding to the network devices 102 may be manually added to the configuration management database 104 by system administrators. In some embodiments, data corresponding to the network devices 102 may be discovered using various network discovery and management techniques, and then the discovered data may be added to the configuration management database 104 by system administrators.

Each network device 102 may maintain a collection of information to inform and validate reconfiguration activities. In system 100, devices associated with each network device 102 may be defined in the configuration management database 104, in addition to identifying information for each network device 102. This task involves developing a storage mechanism expressive enough to inform the reconfiguration process of any underlying dependencies (devices associated with each network device 102) of each network device 102.

The configuration management database 104 may be in communication to network devices 102 via a network and include a non-transitory machine-readable storage media capable of receiving, storing, updating the records of the network devices 102. The configuration management database 104 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by a processor 106 and/or network devices 102.

In some embodiments, a memory of the configuration management database 104 may be a non-volatile storage device for storing alert element data and instructions, to be used by a processor 106 and/or network devices 102. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, a memory of configuration management database 104 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

FIG. 2 shows execution of a method showing operations of reconfiguring network devices, according to a method 200. The method 200 shown in FIG. 2 comprises execution steps 202, 204, 206, and 208. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of FIG. 2 is described as being executed by a single processor in this embodiment. However, one having skill in the art will appreciate that, in some embodiments, steps may be executed by any number of processors operating in a distributed computing environment. In some cases, a processor executing one or more steps may be programmed to execute various other, unrelated features, where such processor does not need to be operating strictly as the processor described herein.

In step 202, a processor is configured to receive a network reconfiguration request corresponding to a first network device of a plurality of network devices. Each of the plurality of network devices may be directly or indirectly connected to each other within a network system to perform one or more tasks. The plurality of network devices may include, but not limited to, a server computer, a database, a switch, a hub, and a workstation computer.

In step 204, upon receiving the network reconfiguration request corresponding to a first network device, the processor is then configured to query a non-transitory storage medium such as a configuration management database. The configuration management database is used for storing a record of the plurality of network devices such as identification data of each network device. The configuration management database is also used for recording relationships and network dependency configuration of a plurality of network devices. In some embodiments, the relationships and the network dependency configuration may be recorded using a graph database management system, such as Neo4j, in a graphical and/or tree format. The graph database may contain data records outlining properties associated with all the network devices, attributes associated with all the network devices, linked dependencies (associated devices) of each network device, and other relevant metadata associated with all the network devices. The graph database may be augmented with a real-time status information of the network devices, based on which the processor executes reconfiguration processes of various network devices.

The processor may be configured to query a database using an application programming interface (API) to retrieve one or more data records of a first network device. The API may be designed for requesting information from the database, and returning an up-to-date representation of the requested data. When the processor, via the API, requests an attribute of the first network device from the database, said attribute and other identifying information stored within the database is returned to the processor. The processor may also use the API for requesting attribute assignment of the first network device, showing overall network system status, registering new devices in the network system, and sending/receiving first network device status.

In response to a query, the processor may receive one or more data records containing a network dependency configuration of a first network device. The network dependency configuration of the first network device may indicate a first set of network devices associated with the first network device. For instance, a database contains information of all the network devices and their dependency relationships such as a list of attributes of all the network devices and devices associated with or dependent upon each network device. Each network device network dependency configuration may also contain a list of reconfiguration operations linked to attributes that are being reconfigured.

In step 206, the processor is configured to reconfigure the first network device based on the network reconfiguration request and propagate complementary reconfigurations to a first subset of network devices of the first set of network devices based on the network dependency configuration of the first network device. For example, a processor may evaluate the network dependency configuration of the first network device, and may determine that only a first subset of network devices of the first set of network devices have to be reconfigured along with the first network device. In such a case, the processor may then execute reconfiguration operations for the first network device and the first subset of network devices. The reconfiguration operations may be user-defined shell commands or API instructions designed to run on the first network device and the first subset of network devices such that when the shell commands or API instructions are prompted by the processor, the reconfiguration process may be triggered on the first network device and the first subset of network devices, and thereby modifying the state of the network system.

In some embodiments, the processor may execute reconfiguration process to perform the reconfiguration of the first network device and the first subset of network devices by changing IP addresses of each of the first network device and the first subset of network devices. In some embodiments, the processor may execute reconfiguration process to perform the reconfiguration of the first network device and the first subset of network devices correspond to changing host name of each of the first network device and the first subset of network devices. In some embodiments, the processor may execute reconfiguration process to perform the reconfiguration of the first network device and the first subset of network devices correspond to changing cloud infrastructure provider of each of the first network device and the first subset of network devices. In some embodiments, a processor may execute reconfiguration process to perform the reconfiguration of the first network device and the first subset of network devices correspond to generating a secure firewall for each of the first network device and the first subset of network devices. Upon completion of the reconfiguration process, the processor is then configured to update the record associated with the first network device and the first subset of network devices in the database.

In step 208, the processor is configured to transmit a reconfiguration notification to a second subset of network devices of the first set of network devices in response to reconfiguring the first network device and propagating the complementary reconfigurations to the first subset of the network devices.

For example, the processor may evaluate the network dependency configuration of the first network device, and may determine that only a first subset of network devices of the first set of devices have to be reconfigured along with the first network device whereas a second subset of network devices of the first set of network devices have to be notified about information associated with new configuration of the first network device and/or the first subset of the network devices. In such a case, the processor may then transmit messages to the second subset of network devices about reconfiguration and/or updated configuration of the first network device and the first subset of the network devices.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   identifying, by a computer, a changed attribute of a first network device of one or more attributes;
   receiving, by the computer, configuration information for the first network device, the configuration information indicating: a plurality of dependent network devices having one or more dependent attributes corresponding to the one or more attributes of the first network device;
   determining, by the computer, a reconfiguration operation executed to produce the changed attribute of the first network device; and
   transmitting, by the computer, a reconfiguration notification to a subset of one or more dependent network devices having a dependent attribute corresponding to the changed attribute, the reconfiguration notification indicating the reconfiguration operation for changing the dependent attribute in accordance with the changed attribute.

2. The method according to claim 1, further comprising receiving, by the computer, a network reconfiguration request for the first network device of a plurality of network devices configured for producing the changed attribute.

3. The method according to claim 2, wherein the network reconfiguration request indicates the reconfiguration operation for producing the changed attribute, and wherein the computer determines the reconfiguration operation based upon the network reconfiguration request.

4. The method according to claim 1, further comprising querying, by the computer, a configuration database configured to store a plurality of data records containing the configuration information of the first network device, wherein the computer receives the configuration information for the first network device from the configuration database.

5. The method according to claim 4, wherein the computer determines the reconfiguration operation based upon the configuration information received from the configuration database.

6. The method according to claim 1, wherein one or more reconfiguration operations correspond to the one or more attributes of the first network device and the one or more dependent attributes, and wherein the computer determines the reconfiguration operation according to the changed attribute.

7. The method according to claim 1, further comprising determining, by the computer, the subset of the one or more dependent network devices based upon the configuration information from a plurality of network devices.

8. The method according to claim 1, further comprising updating, by the computer, the configuration information for the first network device and the one or more dependent network devices of the subset in a configuration database based upon a reconfiguration request.

9. The method according to claim 1, wherein the one or more attributes of the first network device and the one or more dependent attributes include at least one of an IP address, a host name, a cloud infrastructure provider, and a secure firewall.

10. The method according to claim 1, further comprising reconfiguring, by the computer, the first network device at a predetermined interval to produce the changed attribute for the first network device according to the reconfiguration operation.

11. A computer-implemented method comprising:
a configuration database configured to store configuration information for a plurality of network devices; and
processor in communication with the configuration database configured to:
identify a changed attribute of a first network device of one or more attributes;
receive the configuration information for the first network device, the configuration information indicating: a plurality of dependent network devices having one or more dependent attributes corresponding to the one or more attributes of the first network device;
determine a reconfiguration operation executed to produce the changed attributed of the first network device; and
transmit a reconfiguration notification to a subset of one or more dependent network devices having a dependent attribute corresponding to the changed attribute, the reconfiguration notification indicating the reconfiguration operation for changing the dependent attribute in accordance with the changed attribute.

12. The system according to claim 11, wherein the processor is further configured to receive a network reconfiguration request for the first network device of the plurality of network devices configured for producing the changed attribute.

13. The system according to claim 12, wherein the network reconfiguration request indicates the reconfiguration operation for producing the changed attribute, and wherein the processor is configured to determine the reconfiguration operation based upon the network reconfiguration request.

14. The system according to claim 11, wherein the processor is configured to receives the configuration information for the first network device from the configuration database.

15. The system according to claim 14, wherein the processor is configured to determine the reconfiguration operation based upon the configuration information received from the configuration database.

16. The system according to claim 11, wherein one or more reconfiguration operations correspond to the one or more attributes of the first network device and the one or more dependent attributes, and wherein the processor is configured to determine the reconfiguration operation according to the changed attribute.

17. The system according to claim 11, wherein the processor is configured to determine the subset of the one or more dependent network devices based upon the configuration information from the plurality of network devices.

18. The system according to claim 11, wherein the processor is configured to update the configuration information for the first network device and the one or more dependent network devices of the subset in the configuration database based upon a reconfiguration request.

19. The system according to claim 11, wherein the one or more attributes of the first network device and the one or more dependent attributes include at least one of an IP address, a host name, a cloud infrastructure provider, and a secure firewall.

20. The system according to claim 11, wherein the processor is configured to reconfigure the first network device at a predetermined interval to produce the changed attribute for the first network device according to the reconfiguration operation.

* * * * *